A. C. GRAHAM.
PAWL AND RATCHET MECHANISM.
APPLICATION FILED JULY 14, 1914.

1,188,170.

Patented June 20, 1916.

WITNESSES

INVENTOR
Albert C. Graham
BY
ATTORNEYS

UNITED STATES PATENT OFFICE.

ALBERT C. GRAHAM, OF BARTLESVILLE, OKLAHOMA.

PAWL-AND-RATCHET MECHANISM.

1,188,170.     Specification of Letters Patent.     Patented June 20, 1916.

Application filed July 14, 1914. Serial No. 850,901.

*To all whom it may concern:*

Be it known that I, ALBERT C. GRAHAM, a citizen of the United States, and a resident of Bartlesville, in the county of Washington and State of Oklahoma, have invented a new and Improved Pawl-and-Ratchet Mechanism, of which the following is a full, clear, and exact description.

My invention relates more particularly to the crank of a well-drilling apparatus, and the means for actuating the crank from the band-wheel.

It is a prime object of my invention to provide for actuating the band-wheel by an internal combustion engine to overcome the expense and inconvenience of operating a steam engine under conditions where water for the steam boiler is required to be brought from a distance. With the ordinary band-wheel and rigid crank rig the internal combustion engine, owing to its heavy fly wheels, is not adapted to give the necessary drilling movement to the crank.

My invention overcomes the difficulty by means of a novel arrangement of a flexible crank rig, and adjustable retarding means therefor, whereby the crank is rocked in one direction by the band-wheel shaft, and permitted to turn back on the shaft to give the drop movement to the drill.

The invention will be particularly explained in the specific description following.

Reference is to be had to the accompanying drawings forming a part of this specification, in which similar characters of reference indicate corresponding parts in all the views.

Figure 1:
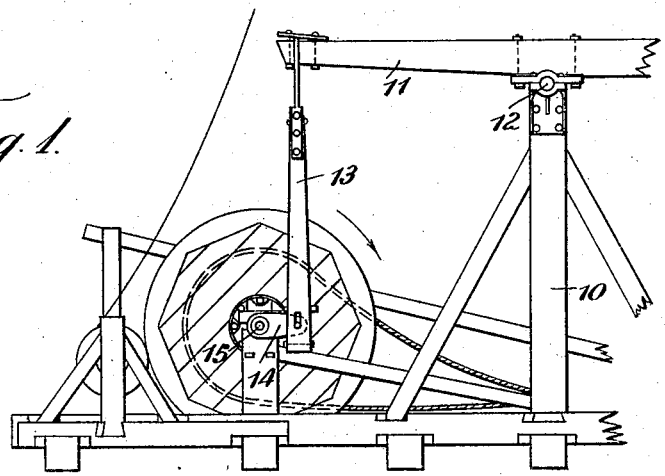
Figure 2:
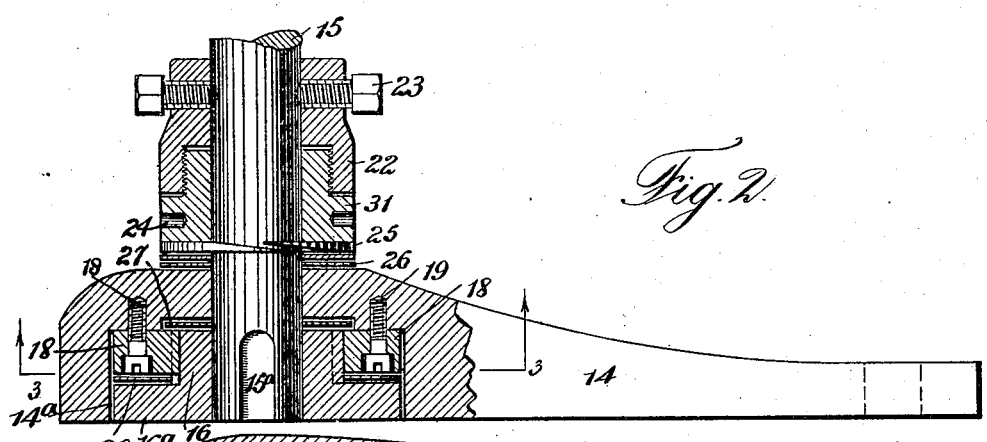
Figure 3:
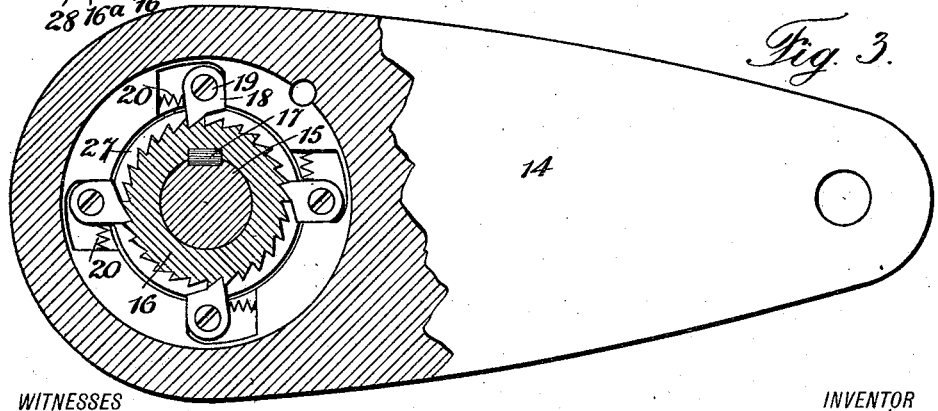

Figure 1 is a partial side elevation of a drilling apparatus embodying my invention; Fig. 2 is a detail longitudinal section on an enlarged scale, showing my improved crank and its appurtenances applied to the band-wheel shaft, a split washer forming part of the frictional retarding means being shown in plan view in the interest of clearness; and Fig. 3 is a transverse section on the line 3—3 of Fig. 2.

Referring to Fig. 1, any approved frame 10 is provided, the beam 11 of which is rockably mounted, as at 12 on the frame, and is connected by a pitman 13 with the crank 14 on the shaft 15 of the usual band-wheel.

In applying my invention in accordance with the illustrated example to the rig shown, the crank 14 is loosely mounted on the band-wheel shaft 15, and a ratchet wheel 16 is keyed fast to the shaft by a key 17, the key fitting a keyway $15^a$ in the shaft and a corresponding way in the ratchet wheel. The ratchet teeth of the wheel 16 are formed on the hub of the wheel, there being a radial flange $16^a$ projecting beyond the hub, thereby producing an annular space within the flange $16^a$ and radially outward from the hub of the ratchet wheel. In the annular space thus produced, pawls 18 are pivotally mounted on the crank 14, the said crank being recessed in a face thereof, as at $14^a$, to accommodate the said pawls 18 and the ratchet wheel 16. The pawls are shown as secured by screws or stub bolts 19, and normally are pressed into engagement with the teeth of the ratchet wheels by springs 20. The arrangement is such that the crank will be rocked in one direction by the shaft 15 acting through the ratchet wheel 16 and pawls 18, but said crank may slip on the ratchet in the opposite direction, giving the drop movement to the drilling tool.

In order to prevent a too free movement of the crank in turning about the shaft 15 and ratchet wheel 16, I provide a frictional retarding means as follows: A loose collar 21 on the shaft 15 has threaded engagement with a set collar 22 adjustably secured on the shaft by set screws 23. The collar 21 has a suitable formation for receiving a wrench, there being shown radial holes 24. Interposed between the face of the collar 21 and the adjacent face of the crank 14 are frictional retarding elements shown as composed of a split washer 25, shown in plan in Fig. 2, and one, two or more friction disks 26.

Additional friction elements are provided and arranged between the opposed faces of the crank 14 and ratchet wheel 16, there being a friction ring or disk 27 between the hub of the ratchet wheel and the opposed face of the crank, and if desired, a further friction ring 28 may be interposed between an inner face of the flange $16^a$ of the ratchet wheel and the pawls 18 and their stub bolts 19.

The setting up of the collar 21 will vary the resistance of the several retarding elements 25, 26, 27, and 28, as will be obvious, and thereby the retardation of the crank 14 may be regulated to give the best results.

Having thus described my invention, I claim as new, and desire to secure by Letters Patent:

1. In a well drilling machine, the combination with a band wheel of a shaft on which the band wheel is fixed, a crank loose on said shaft, means connected with the crank to rock the same, pawls on the crank, a ratchet wheel fixed on the shaft at one side of the crank and engaged by said pawls, a collar on the shaft at the side opposite the ratchet wheel, a set collar having threaded engagement with the first mentioned collar; means to secure the set collar in adjusted position on the shaft, and friction elements on the shaft between the said crank and the first collar.

2. In an apparatus of the character described, a driven shaft, a crank loose on the shaft, the said crank being formed with a recess, a ratchet wheel fixed on the shaft and received in the said recess, said wheel comprising a hub and a radially extending flange, pawls on the crank behind the flange of the ratchet wheel and engaging the ratchet teeth of the said wheel, a friction disk between the hub of the ratchet wheel and the opposed face of the crank, a friction ring around the hub of the ratchet wheel adjacent to the inner face of the flange of the said ratchet wheel and between said flange and the pawls on the crank, an adjustable collar on the shaft at the opposite side of the crank from the ratchet wheel, resilient friction means between the said collar and the crank, and a lock nut adjustable on the shaft and having threaded engagement with the said collar.

In testimony whereof I have signed my name to this specification in the presence of two subscribing witnesses.

ALBERT C. GRAHAM.

Witnesses:
 JAS. P. EASTERLY,
 KATHRYN PATRICK.